United States Patent
Benhase et al.

(10) Patent No.: US 8,935,479 B2
(45) Date of Patent: *Jan. 13, 2015

(54) ADAPTIVE CACHE PROMOTIONS IN A TWO LEVEL CACHING SYSTEM

(75) Inventors: Michael T. Benhase, Tucson, AZ (US); Stephen L. Blinick, Tucson, AZ (US); Evangelos S. Eleftheriou, Rueschlikon (CH); Lokesh M. Gupta, Tucson, AZ (US); Robert Haas, Adliswil (CH); Xiao-Yu Hu, Horgen (CH); Ioannis Koltsidas, Zurich (CH); Roman A. Pletka, Uster (CH)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/466,861

(22) Filed: May 8, 2012

(65) Prior Publication Data
US 2013/0232295 A1    Sep. 5, 2013

Related U.S. Application Data (63) Continuation of application No. 13/412,412, filed on Mar. 5, 2012.

(51) Int. Cl.
G06F 12/00    (2006.01)
G06F 3/06     (2006.01)

(52) U.S. Cl.
USPC .................... 711/122; 711/118; 711/137

(58) Field of Classification Search
CPC . G06F 12/0276; G06F 3/0608; G06F 3/0641; G06F 12/0269; G06F 9/4423; G06F 9/4428; G06F 9/465
See application file for complete search history.

(56) References Cited

U.S. PATENT DOCUMENTS

| | | | |
|---|---|---|---|
| 5,649,156 A |   | 7/1997 | Vishlitzky et al. |
| 5,860,131 A | * | 1/1999 | Daub .............................. 711/170 |
| 6,141,731 A | * | 10/2000 | Beardsley et al. ............ 711/136 |

(Continued)

FOREIGN PATENT DOCUMENTS

| | | |
|---|---|---|
| JP | 61131142 | 6/1986 |
| JP | 652060 | 2/1994 |

(Continued)

OTHER PUBLICATIONS

PCT International Search Report & Written Opinion dated Jul. 2, 2013 for PCT/IB2013/051313 filed Feb. 18, 2003, 10 pp.

(Continued)

*Primary Examiner* — Yong Choe
*Assistant Examiner* — Mohamed Gebril
(74) *Attorney, Agent, or Firm* — Janaki K. Davda; Konrad Raynes Davda & Victor LLP

(57) ABSTRACT

Provided are a computer program product, system, and method for managing data in a first cache and a second cache. A reference count is maintained in the second cache for the page when the page is stored in the second cache. It is determined that the page is to be promoted from the second cache to the first cache. In response to determining that the reference count is greater than zero, the page is added to a Least Recently Used (LRU) end of an LRU list in the first cache. In response to determining that the reference count is less than or equal to zero, the page is added to a Most Recently Used (LRU) end of the LRU list in the first cache.

5 Claims, 11 Drawing Sheets

(56) References Cited

U.S. PATENT DOCUMENTS

| | | | |
|---|---|---|---|
| 6,507,893 B2 | 1/2003 | Dawkins et al. | |
| 6,738,865 B1 | 5/2004 | Burton et al. | |
| 6,738,866 B2 | 5/2004 | Ting | |
| 7,711,905 B2 | 5/2010 | Flemming et al. | |
| 7,769,974 B2 | 8/2010 | Bhansali et al. | |
| 8,171,224 B2 * | 5/2012 | Luick | 711/122 |
| 2003/0105928 A1 * | 6/2003 | Ash et al. | 711/136 |
| 2006/0136668 A1 * | 6/2006 | Rudelic | 711/118 |
| 2007/0067575 A1 | 3/2007 | Morris et al. | |
| 2008/0005475 A1 | 1/2008 | Lubbers et al. | |
| 2008/0104323 A1 | 5/2008 | Colglazier et al. | |
| 2011/0010514 A1 | 1/2011 | Benhase et al. | |
| 2011/0107042 A1 | 5/2011 | Herron | |
| 2011/0238908 A1 | 9/2011 | Kurita | |
| 2012/0331234 A1 * | 12/2012 | Hirao et al. | 711/135 |

FOREIGN PATENT DOCUMENTS

| | | |
|---|---|---|
| JP | 2001109664 | 4/2001 |
| JP | 2002049528 | 2/2002 |
| JP | 2011204060 | 10/2011 |

OTHER PUBLICATIONS

English translation of JP2001109664 published Apr. 20, 2001 by Ricoh Co Ltd, 6 pp.

English translation of JP2002049528 published Feb. 15, 2002 by IBM Corporation, 10 pp.

English translation of JP2011204060 published Oct. 13, 2011 by NEC Corp, 10 pp.

U.S. Appl. No. 13/412,412, filed Mar. 5, 2012, entitled "Adaptive Cache Promotions in a Two Level Caching System", invented by M.T. Benhase, et al., 35 pp.

Preliminary Amendment for U.S. Appl. No. 13/412,412, filed May 8, 2012, 5 pp.

Office Action, pp. 33, for U.S. Appl. No. 13/412,412, filed Mar. 5, 2012.

Response dated Jan. 9, 2014, pp. 12, to Office Action, pp. 33, for U.S. Appl. No. 13/412,412, filed Mar. 5, 2012.

Final Office Action, dated Apr. 11, 2014, for U.S. Appl. No. 13/412,412, filed Mar. 5, 2012, entitled "Adaptive Cache Promotions in a Two Level Caching System", invented by Michael T. Benhase et al., Total 25 pages.

Response to Final Office Action, dated Jun. 26, 2014, for U.S. Appl. No. 13/412,412, filed Mar. 5, 2012,, entitled "Adaptive Cache Promotions in a Two Level Caching System", invented by Michael T. Benhase et al., Total 10 pages.

Notice of Allowance received Aug. 29, 2014, pp. 13, for U.S. Appl. No. 13/412,412, filed Mar. 5, 2012.

Examination Report dated Sep. 26, 2014, pp. 3, for Application No. GB1414607.0.

* cited by examiner

ADAPTIVE CACHE PROMOTIONS IN A TWO LEVEL CACHING SYSTEM

CROSS-REFERENCE TO RELATED APPLICATION

This application is a continuation of U.S. patent application Ser. No. 13/412,412, filed Mar. 5, 2012, which application is incorporated herein by reference in its entirety.

BACKGROUND OF THE INVENTION

1. Field of the Invention

The present invention relates to a computer program product, system, and method for adaptive cache promotions in a two level caching system.

2. Description of the Related Art

A cache management system buffers pages in a storage device recently accessed as a result of read and write operations in a faster access storage device, such as memory, than the storage device storing the requested pages. Subsequent read requests to pages in the faster access cache memory are returned at a faster rate than returning the requested pages from the slower access storage, thus reducing read latency. The cache management system may also return complete to a write request when the modified page directed to the storage device is written to the cache memory and before the modified page is written out to the storage device, such as a hard disk drive. The write latency to the storage device is typically significantly longer than the latency to write to a cache memory. Thus, using cache also reduces write latency.

A cache management system may maintain a linked list having one entry for each page stored in the cache, which may comprise write data buffered in cache before writing to the storage device or read data. In the commonly used Least Recently Used (LRU) cache technique, if a page in the cache is accessed, i.e., a cache "hit", then the entry in the LRU list for the accessed page is moved to a Most Recently Used (MRU) end of the list. If the requested page is not in the cache, i.e., a cache miss, then the page in the cache whose entry is at the LRU end of the list may be removed (or destaged back to storage) and an entry for the page data staged into cache from the storage is added to the MRU end of the LRU list. With this LRU cache technique, pages that are more frequently accessed are likely to remain in cache, while data less frequently accessed will more likely be removed from the LRU end of the list to make room in cache for newly accessed pages.

The LRU cache technique seeks to optimize for temporal locality so as to destage pages that are least likely to be rewritten soon in order to minimize the number of destage operations, i.e., if a write that is not destaged is overwritten than the destaging of the overwritten write is avoided, thus saving the time and effort of writing the data from cache to disk. On the other hand there is also a desire to destage in a manner that exploits spatial locality, which means that data is written to storage locations that are closest to each other to minimize the distance the storage device write mechanism and storage media needs to be moved to reach the next storage location to write.

One technique for exploiting both temporal and spatial locality is the Wise Ordering for Writes (WOW) algorithm. The WOW algorithm employs a circular linked list or clock where the circular linked list has one entry for each write request buffered in cache. The entries are ordered in the linked list according to the storage location to which the associated write request is directed to exploit the benefits of spatial locality. Further, each entry includes a bit indicating whether the write data for the storage location in the cache has been recently updated. The bit for an entry is set when the write data for the entry is updated. A pointer points to a current entry in the circular linked list. A task using the WOW algorithm accesses an entry addressed by the pointer. If the bit for the entry indicates that the data for the entry in cache has been recently updated, then the bit is set to indicate that the write data has not been recently updated and the pointer incremented to point to the next entry so that the entry having write data to a storage location next closest in spatial proximity to the previously written storage location is considered. The entry is selected to write that is closest in spatial proximity to the last written storage location and whose bit indicates that the write data for the entry has not recently been updated.

Thus, with the WOW algorithm, spatial locality is exploited because a next entry to write is selected for consideration that is closest in spatial proximity to the last destaged write request. Further, temporal locality is exploited because an entry that has recently been written will be skipped until the pointer circles back to that skipped entry to consider.

Disk drives may implement the WOW algorithm and other algorithms that take both the linear and the angular position of the write pages into account and optimize for both with respect to a current write head position to determine the minimal total service time. This process is referred to as "command re-ordering based on seek and rotational optimization". The disk drive logic boards will analyze write requests and determine which to do first based on both how much time will be required to seek to the various cylinders and angular position of the page to write, and how much time will elapse waiting for the data to rotate under the heads.

There is a need in the art for improved techniques for using a two level caching system.

SUMMARY

Provided are a computer program product, system, and method for managing data in a first cache and a second cache. A reference count is maintained in the second cache for the page when the page is stored in the second cache. It is determined that the page is to be promoted from the second cache to the first cache. In response to determining that the reference count is greater than zero, the page is added to a Least Recently Used (LRU) end of an LRU list in the first cache. In response to determining that the reference count is less than or equal to zero, the page is added to a Most Recently Used (MRU) end of the LRU list in the first cache.

DETAILED DESCRIPTION

Figure 1:
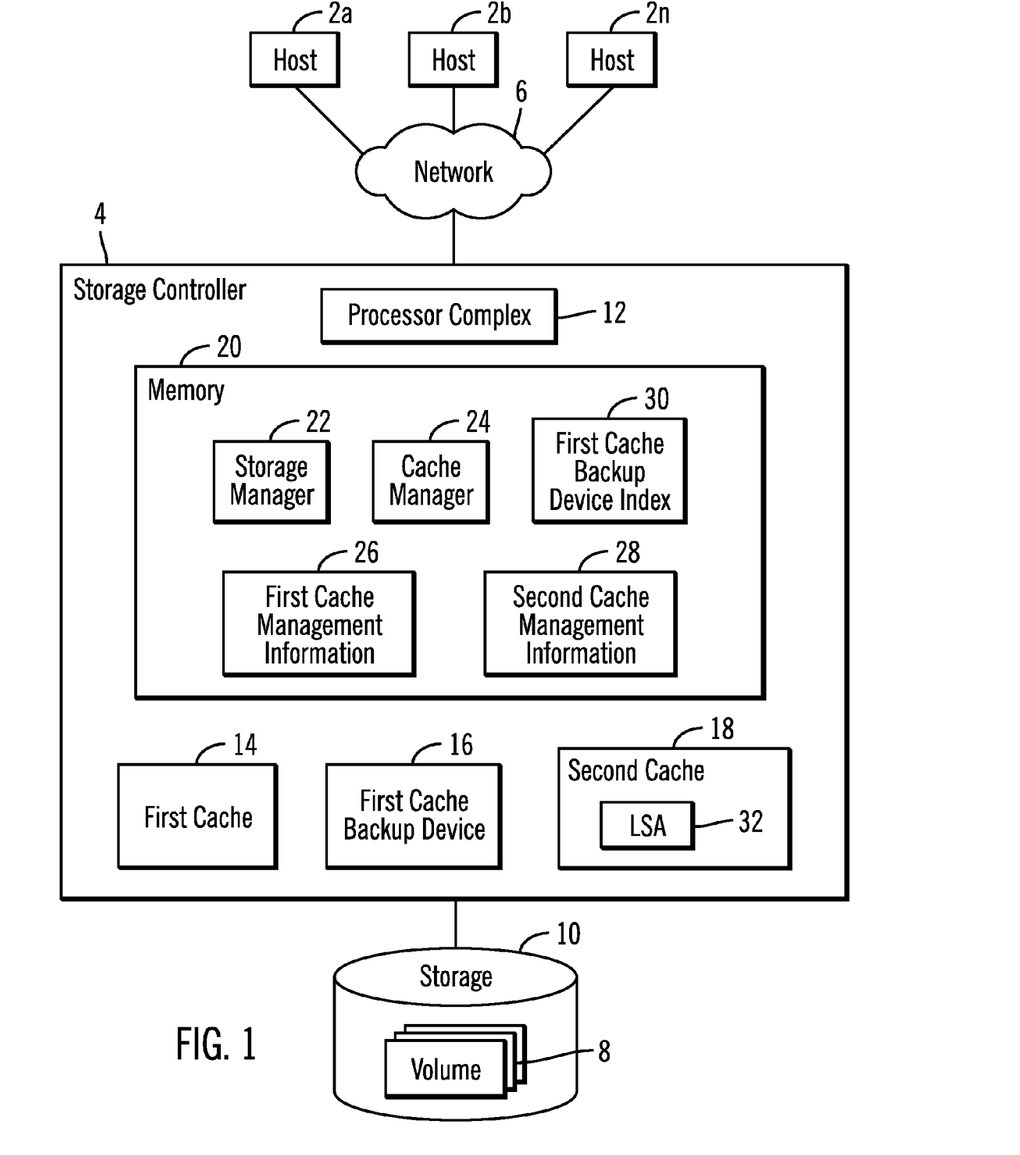
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10, which is coupled to the storage controller 4. The storage controller 4 includes a processor complex 12, including one or more processors with single or multiple cores, a first cache 14, a first cache backup device 16, to backup pages in the cache 14, and a second cache 18. The first 14 and second 18 caches cache data transferred between the hosts 2a, 2b . . . 2n and the storage 10. The first cache backup device 16 may provide non-volatile storage of pages in the first cache 14. In a further embodiment, the first cache backup device 16 may be located in a cluster or hardware on a different power boundary than that of the first cache 14.

The storage controller 4 has a memory 20 that includes a storage manager 22 for managing the transfer of pages transferred between the hosts 2a, 2b . . . 2n and the storage 10 and a cache manager 24 that manages data transferred between the hosts 2a, 2b . . . 2n and the storage 10 in the first cache 14, first cache backup device 16, and the second cache 18. A page may comprise any unit of data configured in the storage 10, such as a page, Logical Block Address (LBA), etc., which is part of a larger grouping of pages, such as a volume, logical device, etc. The cache manager 24 maintains first cache management information 26 and second cache management information 28 to manage read (unmodified) and write (modified) pages in the first cache 14 and the second cache 18. A first cache backup device index 30 provides an index of page identifiers to a location in the first cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store pages in a log structured array (LSA) 32, where pages are written in a sequential order as received, thus providing a temporal ordering of the pages written to the second cache 18. In a LSA, later versions of pages already present in the LSA are written at the end of the LSA 32. In alternative embodiments, the second cache 18 may store data in formats other than in an LSA.

In certain embodiments, the first cache 14 may comprise a Random Access Memory (RAM), such as a Dynamic Random Access Memory (DRAM), the second cache 18 may comprise a flash memory, such as a solid state device, and the storage 10 is comprised of one or more sequential access storage devices, such as hard disk drives and magnetic tape.

The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. The storage 10 is coupled to at least one of the first cache 14 and the second cache 18. In certain embodiments, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storage 10. Moreover, in certain embodiments, the second cache 18 may be much larger than the first cache 14.

The first cache 14 may be part of the memory 20 or implemented in a separate memory device, such as a DRAM. In certain embodiments, the first cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Although certain embodiments herein reference a cache index granularity of pages, other embodiments apply to data of different cache index granularity, such as tracks or extents.

Figure 2:
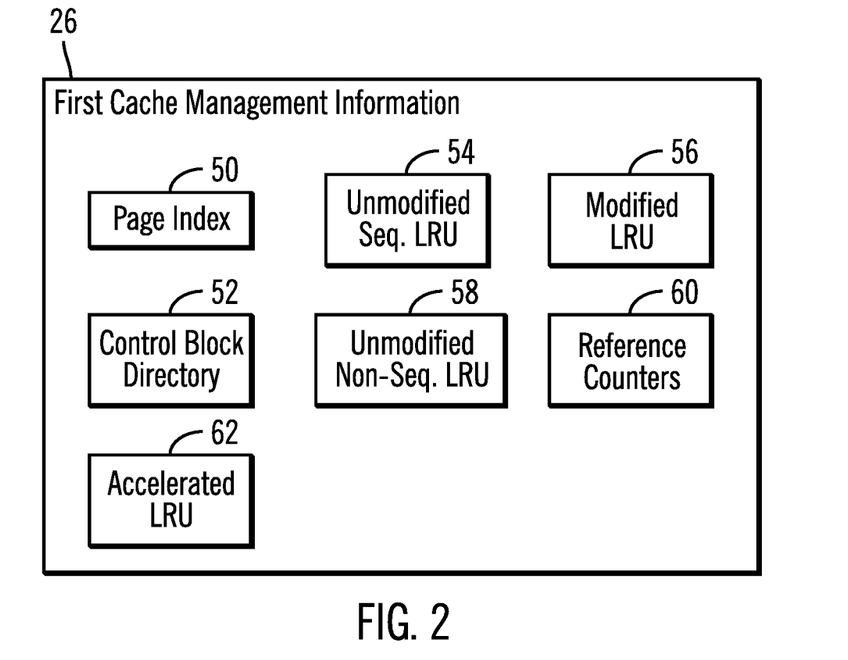
FIG. 2 illustrates an embodiment of first cache management information.

FIG. 2 illustrates an embodiment of the first cache management information 26 including a page index 50 providing an index of pages in the first cache 14 to control blocks in a control block directory 52; an unmodified sequential LRU list 54 providing a temporal ordering of unmodified sequential pages in the first cache 14; a modified LRU list 56 providing a temporal ordering of modified sequential and non-sequential pages in the first cache 14; an unmodified non-sequential LRU list 58 providing a temporal ordering of unmodified non-sequential pages in the first cache 14; reference counters 60; and accelerated LRU 62.

Figure 3:
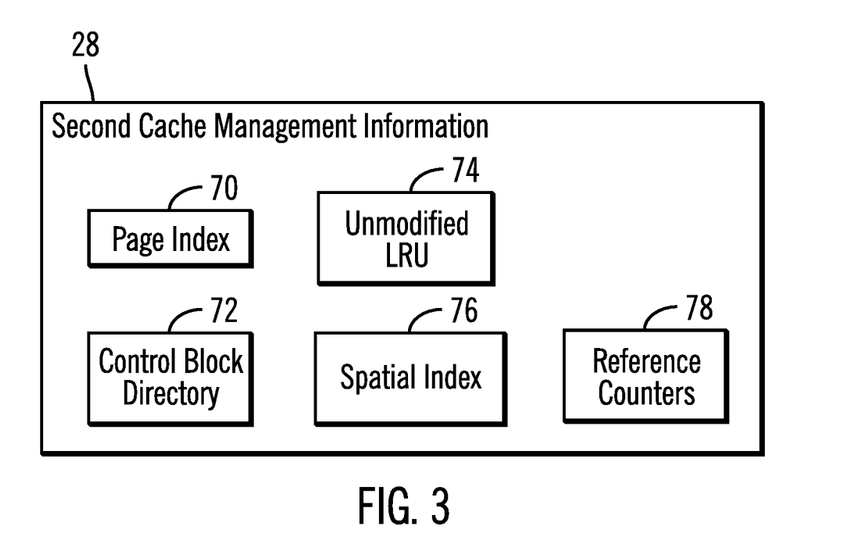
FIG. 3 illustrates an embodiment of second cache management information.

FIG. 3 illustrates an embodiment of the second cache management information 28 including a page index 70 providing an index of pages in the second cache 18 to control blocks in a control block directory 72; an unmodified list 74 providing a temporal ordering of unmodified pages in the second cache 18; a spatial index 76 providing a spatial ordering of the modified pages in the second cache 18 based on the physical locations in the storage 10 at which the modified pages are stored; and reference counters 78.

All the LRU lists 54, 56, 58, and 74 may include the page IDs of pages in the first cache 14 and the second cache 18 ordered according to when the identified page was last accessed. The LRU lists 54, 56, 58, and 74 have a most recently used (MRU) end indicating a most recently accessed page and a LRU end indicating a least recently used or accessed page. The page IDs of pages added to the caches 14 and 18 are added to either the MRU end or the LRU end (depending on the heat of the page) of the LRU list and pages demoted from the caches 14 and 18 are accessed from the LRU end. The page indexes 50 and 70 and spatial index 76 may comprise a scatter index table (SIT). Alternative type data structures may be used to provide the temporal ordering of pages in the caches 14 and 18 and spatial ordering of pages in the second cache 18.

Non-sequential pages may comprise Online Line Transaction Processing (OLTP) pages, which often comprise small block writes that are not fully random and have some locality of reference, i.e., have a probability of being repeatedly accessed.

Figure 4:
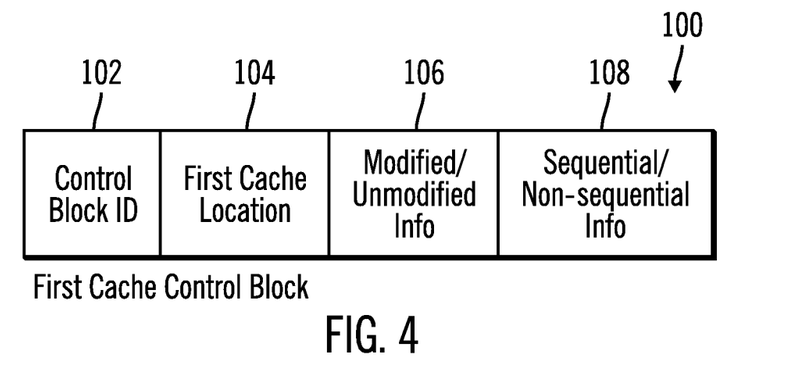
FIG. 4 illustrates an embodiment of a first cache control block.

FIG. 4 illustrates an embodiment of a first cache control block 100 entry in the control block directory 52, including a control block identifier (ID) 102, a first cache location 104 of the physical location of the page in the first cache 14, information 106 indicating whether the page is modified or unmodified, and information 108 indicating whether the page is a sequential or non-sequential access.

Figure 5:
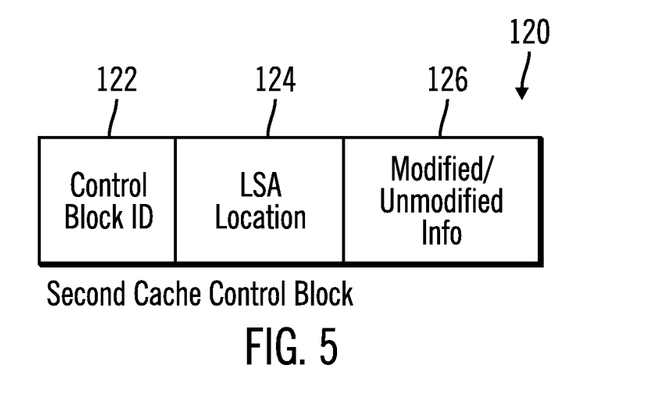
FIG. 5 illustrates an embodiment of a second cache control block.

FIG. 5 illustrates an embodiment of a second cache control block 120 entry in the second cache control block directory 72, including a control block identifier (ID) 122, an LSA location 124 where the page is located in the LSA 32, and information 126 indicating whether the page is modified or unmodified.

Figure 6:
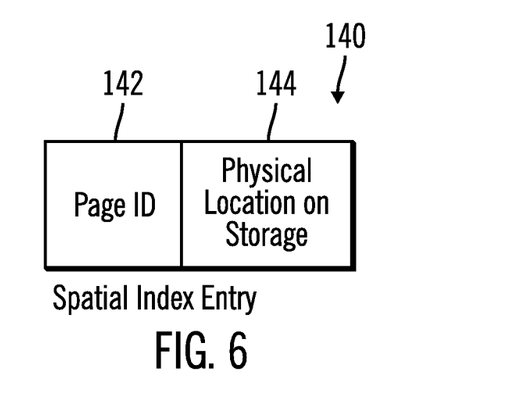
FIG. 6 illustrates an embodiment of a spatial index entry.

FIG. 6 illustrates an embodiment of a spatial index entry 140 including a page identifier 142 of a page in the second cache 18 and the physical location 144 of where the page is stored in the storage 10, such as a cylinder, platter, block address, and storage device identifier.

Figure 7:
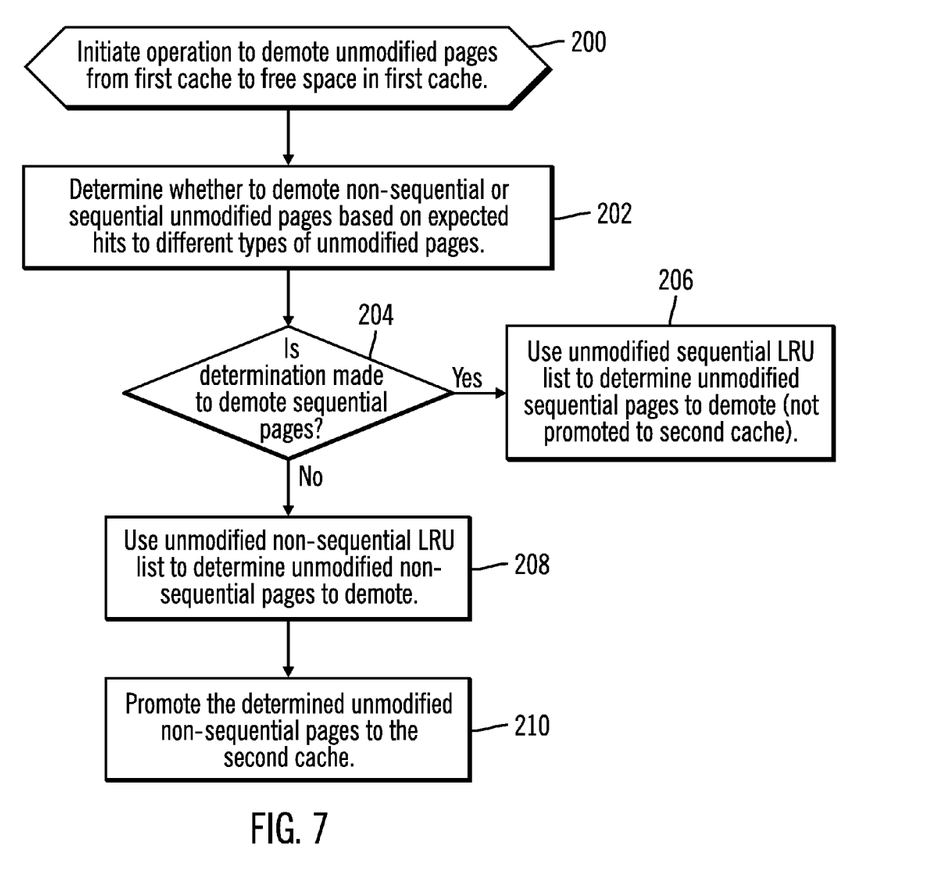
FIG. 7 illustrates an embodiment of operations to demote unmodified pages from the first cache.

FIG. 7 illustrates an embodiment of operations performed by the cache manager 24 to demote unmodified pages from the first cache 14. The demote operation may be initiated upon determining to free space in the first cache 14. Upon initiating (at block 200) an operation to determine whether to remove pages from the first cache 14 to free space in the first cache 14, the cache manager 24 determines (at block 202) whether to demote non-sequential or sequential unmodified pages based on expected hits to different types of unmodified pages. If (at block 204) the determination is to demote unmodified sequential pages, then the cache manager 24 uses (at block 206) the unmodified sequential LRU list 54 to determine unmodified sequential pages to demote, from the LRU end of the list, which are not promoted to the second cache 18. If (at block 204) the determination is made to demote unmodified non-sequential pages, then the cache manager uses the unmodified non-sequential LRU list 58 to determine (at block 208) unmodified non-sequential pages to demote. The unmodified non-sequential pages are promoted (at block 210) to the second cache 18.

Figure 8:
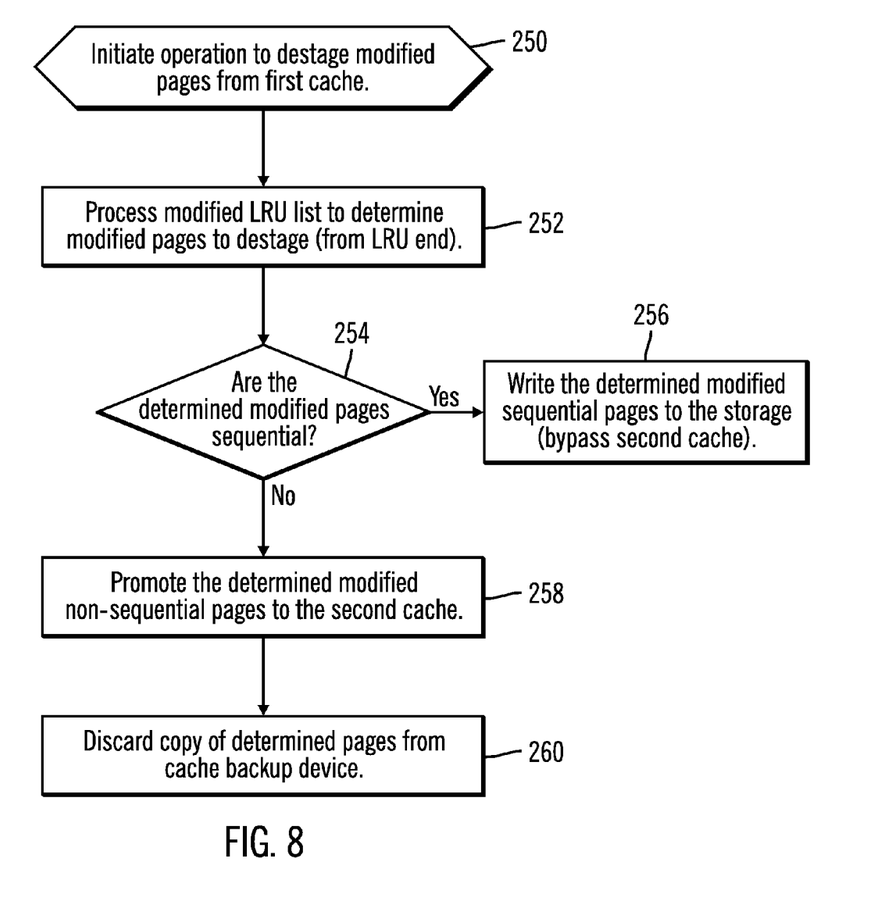
FIG. 8 illustrates an embodiment of operations to destage modified pages from the first cache.

FIG. 8 illustrates an embodiment of operations performed by the cache manager 24 to destage modified pages from the first cache 14. The cache manager 24 may regularly destage pages as part of scheduled operations and increase the rate of destages if space is needed in the first cache backup device 16. Upon initiating (at block 250) the operation to destage modified pages, the cache manager 24 processes (at bock 252) the modified LRU list 56 to determine modified pages to destage, from the LRU end of the LRU list 56. If (at block 254) the determined modified pages are sequential, then the cache manager 24 writes (at block 256) the determined modified sequential pages to the storage 10, bypassing the second cache 18. If (at block 254) the modified pages are non-sequential, then the cache manager 24 promotes (at block 258) the determined modified non-sequential pages to the second cache 18 and discards (at block 260) the copy of the determined modified pages from the first cache backup device 16.

With the operations of FIGS. 7 and 8, non-sequential pages are demoted but not promoted to the second cache 18. Sequential modified (writes) are written directly to the storage 10, bypassing the second cache. Sequential unmodified pages (reads) are discarded and not copied elsewhere, and unmodified non-sequential pages demoted from the first cache 14 are promoted to the second cache 18.

Figure 9:
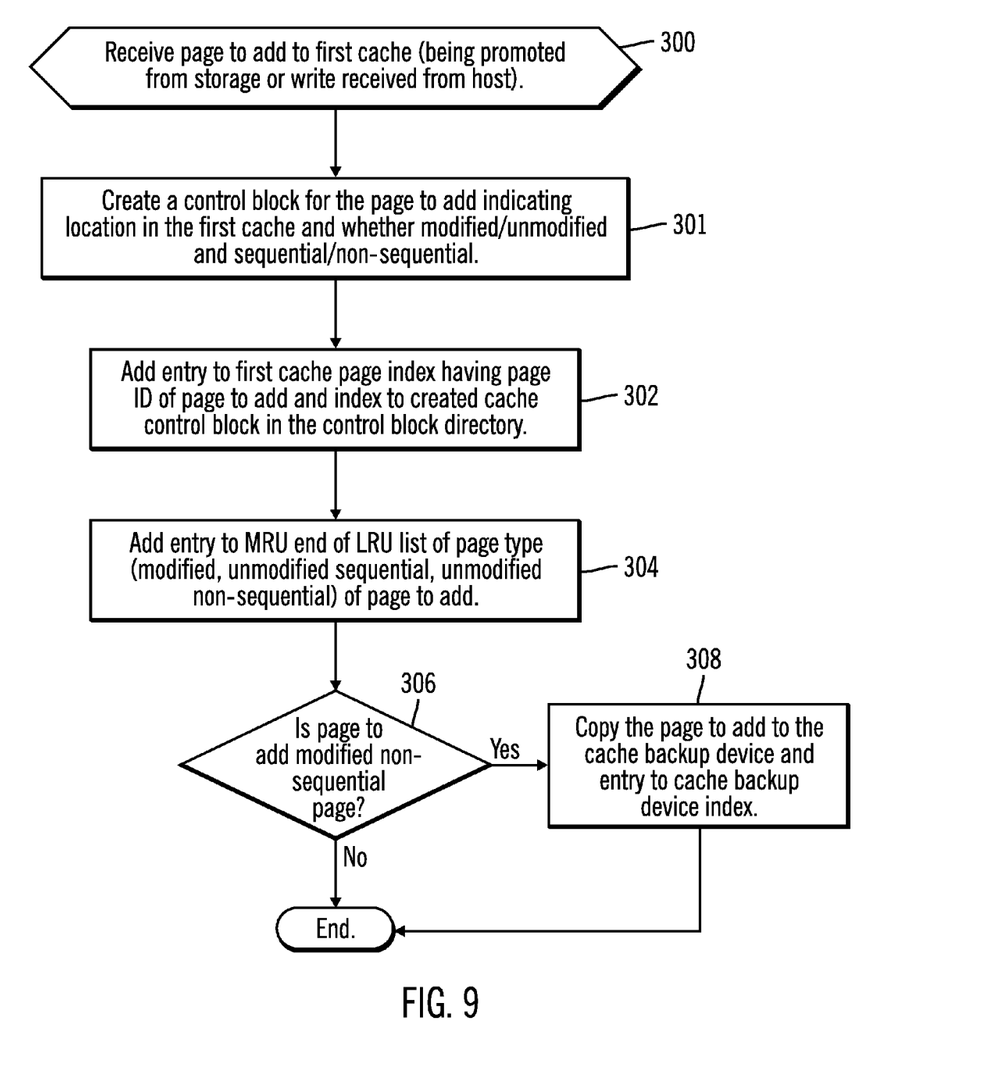
FIG. 9 illustrates an embodiment of operations to add a page to the first cache.

FIG. 9 illustrates an embodiment of operations performed by the cache manager 24 to add, i.e., promote, a page to the first cache 14, which page may comprise a write or modified page from a host 2a, 2b ... 2n or read requested data not found in either cache 14 or 18 and retrieved from the storage 10.

Upon receiving (at block 300) the page to add to the first cache 14, the cache manager 24 creates (at block 301) a control block 100 (FIG. 4) for the page to add indicating the 104 location in the first cache 14 and whether the page is modified/unmodified 106 and sequential/non-sequential 108. This control block 100 is added to the control block directory 52 of the first cache 14. The cache manager 24 adds (at block 302) an entry to the first cache page index 50 having the page ID of page to add and an index to the created cache control block 100 in the control block directory 52. An entry is added (at block 304) to the MRU end of the LRU list 54, 56 or 58 of the page type of the page to add. If (at block 306) the page to add is a modified non-sequential page, then the page to add is also copied (at block 308) to the first cache backup device 16 and an entry is added to the first cache backup device index 30 for the added page. If (at block 306) the page to add is unmodified sequential, control ends.

Figure 10:
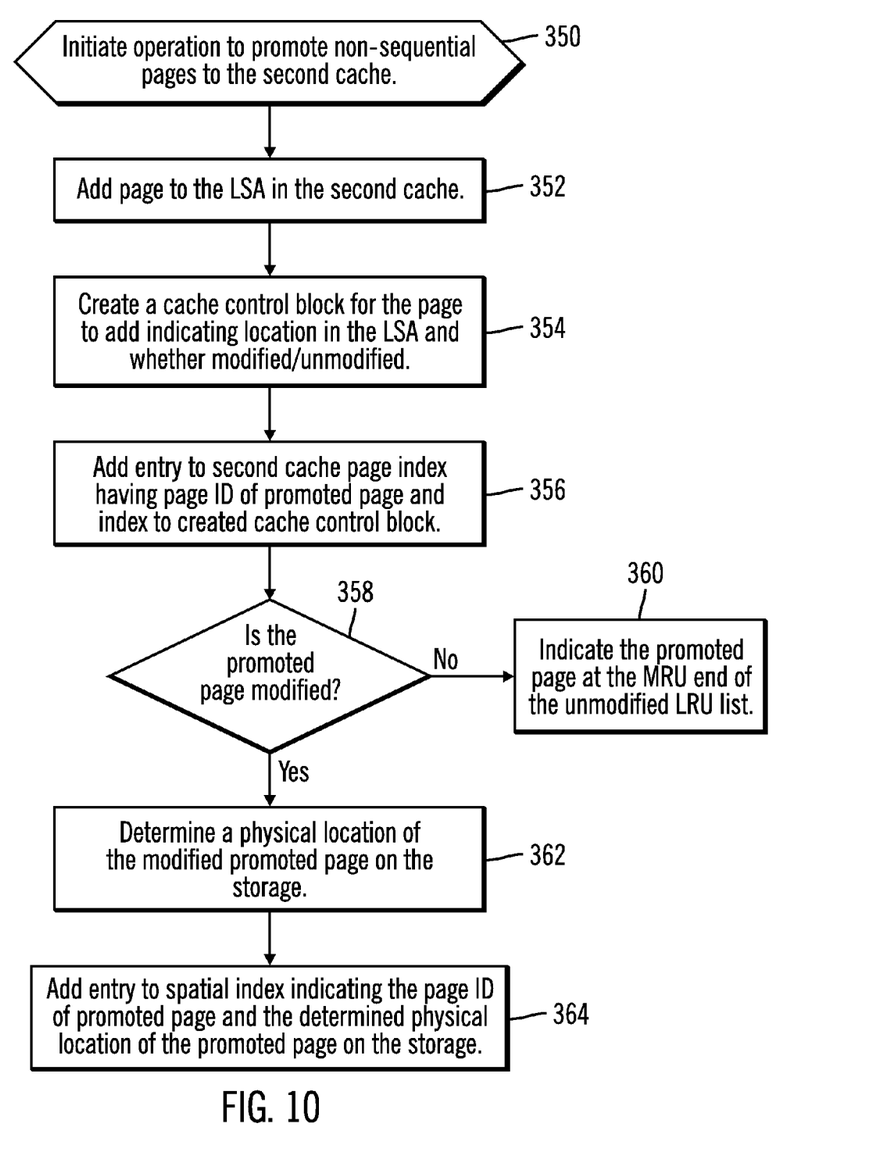
FIG. 10 illustrates an embodiment of operations to promote a page to the second cache.

FIG. 10 illustrates an embodiment of operations performed by the cache manager 24 to promote non-sequential pages to the second cache 18 that is being demoted from the first cache 14. Upon initiating (at block 350) the operation to promote a page to the second cache 18, the cache manager 24 adds (at block 352) the page being promoted to the LSA 32 in the second cache 18 and creates (at block 354) a control block 120 (FIG. 5) for the page to add indicating the page location 124 in the LSA 32 and whether the page is modified/unmodified 126. An entry is added (at block 356) to the second cache page index 70 having the page ID of the promoted page and an index to the created cache control block 120 in the control block directory 72 for the second cache 18. If (from the no branch of block 358) the page being promoted is unmodified data, then the cache manager 24 indicates (at block 360) the promoted page at the MRU end of the unmodified LRU list 74, such as by adding the page ID to the MRU end. If (at block 358) the promoted page is modified data, then the cache manager 24 determines (at block 362) a physical location of the where to write the modified promoted page on the storage 10 and adds (at block 364) an entry to the spatial index 76 indicating the page ID 142 of the promoted page and the determined physical location 144 of the promoted page on the storage 10.

Figure 11:
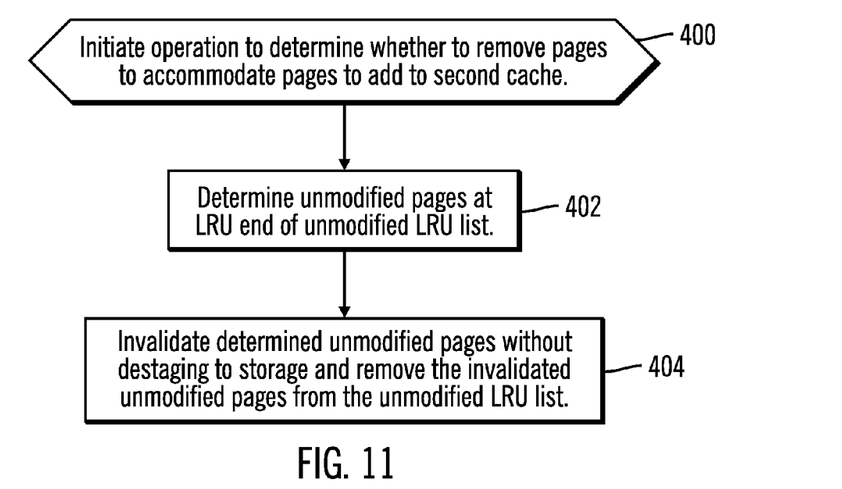
FIG. 11 illustrates an embodiment of operations to free space in the second cache.

FIG. 11 illustrates an embodiment of operations performed by the cache manager 24 to free space in the second cache 18 for new pages to add to the second cache 18, i.e., pages being demoted from the first cache 14. Upon initiating this operation (at block 400) the cache manager 24 determines (at block 402) unmodified pages in the second cache 18 from the LRU end of the unmodified LRU list 74 and invalidates (at block 404) the determined unmodified pages without destaging the invalidated unmodified pages to the storage 10, and also removes the invalidated unmodified pages from the unmodified LRU list 74.

Figure 12:
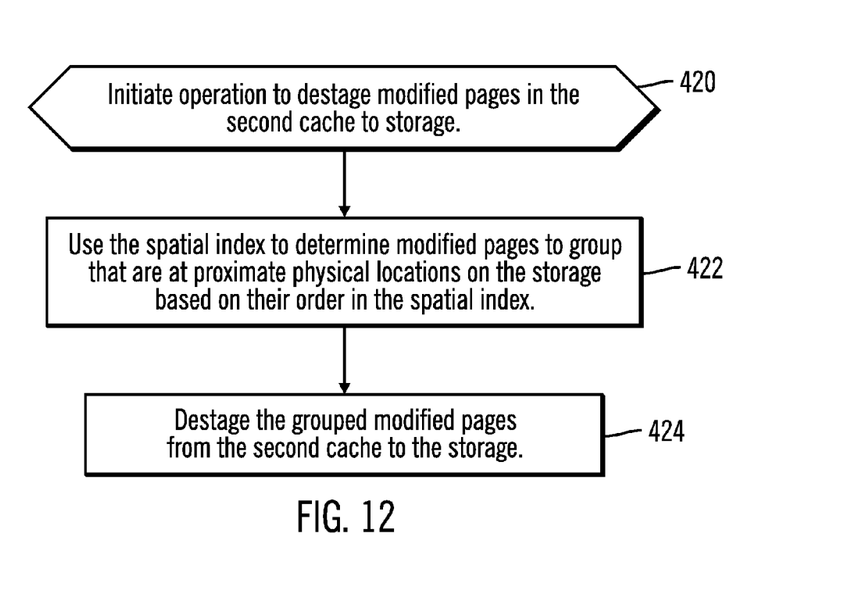
FIG. 12 illustrates an embodiment of operations to destage modified pages from the second cache.

FIG. 12 illustrates an embodiment of operations performed by the cache manager 24 to destage modified pages in the second cache 12 to the storage 10. Upon initiating (at block 420) the destage operation, the cache manager 24 uses (at block 422) the spatial index 76 to determine modified pages in the second cache 18 to group that are at proximate physical locations on the storage 10 based on their order in the spatial index 76, such as a group of pages at consecutive entries 140 (FIG. 6) in the location ordered spatial index 76. The determined grouped modified pages are destaged (at block 424) from the second cache 18 to the storage 10.

The operations of FIG. 12 optimize write operations to the storage 10, which comprises a sequential access storage device, by having the storage 10 write pages at physical locations at closest physical proximity on the storage 10 writing surface, thus minimizing the amount of seeking and movement of the storage 10 write head to write the pages in the second cache 18 to storage 10. The pages were promoted to the second cache 18 from the from the first cache 16 based on temporal factors, such as their position in an LRU list 54, 56, 58, and not in an order optimized for sequential writing to a sequential access storage 10, such as a hard disk drive. Thus, the operations of FIG. 12 optimize the temporally ordered modified pages based on their spatial location on the storage 10 to optimize writing at the storage 10.

Figure 13:
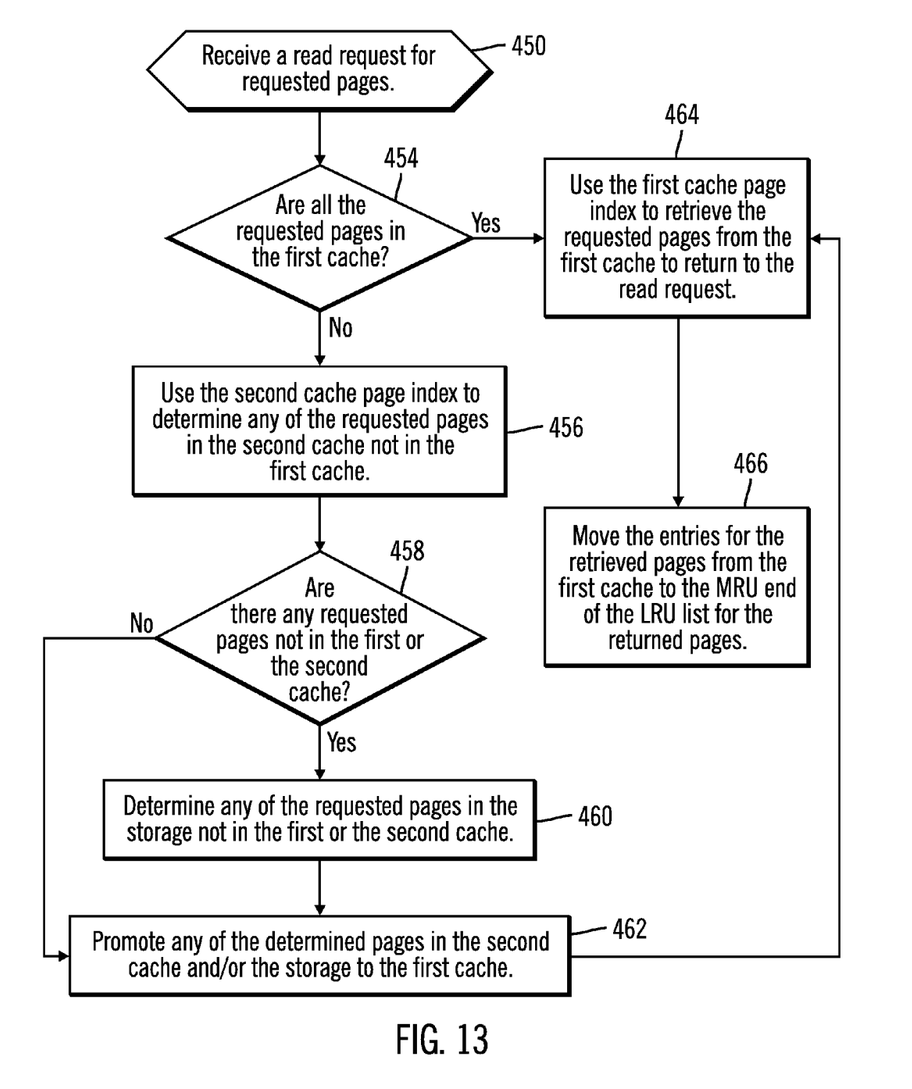
FIG. 13 illustrates an embodiment of operations to process a request for pages to return to a read request.

FIG. 13 illustrates an embodiment of operations performed by the cache manager 24 to retrieve requested pages for a read request from the caches 14 and 18 and storage 10. The storage manager 22 processing the read request may submit requests to the cache manager 24 for the requested pages. Upon receiving (at block 450) the request for the pages, the cache manager 24 uses (at block 454) the first cache page index 50 to determine whether all of the requested pages are in the first cache 14. If (at block 454) all requested pages are not in the first cache 14, then the cache manager 24 uses (at block 456) the second cache page index 70 to determine any of the requested pages in the second cache 18 not in the first cache 14. If (at block 458) there are any requested pages not found in the first 14 and second 18 caches, then the cache manager 24 determines (at block 460) any of the requested pages in the storage 10, from the second cache page index 70, not in the first 14 and the second 18 caches. The cache manager 24 then promotes (at block 462) any of the determined pages in the second cache 18 and the storage 10 to the first cache 14. The cache manager 24 uses (at block 464) the first cache page index 50 to retrieve the requested pages from the first cache 14 to return to the read request. The entries for the retrieved pages are moved (at block 466) to the MRU end of the LRU list 54, 56, 58 including entries for the retrieved pages. With the operations of FIG. 13, the cache manager 24 retrieves requested pages from a highest level cache 14, then second cache 18 first before going to the storage 10, because the caches 14 and 18 would have the most recent modified version of a requested page. The most recent version is first found in the first cache 14, then the second cache 18 if not in the first cache 14 and then the storage 10 if not in either cache 14, 18.

With the operations of FIG. 13, the cache manager 24 retrieves requested pages from a highest level cache 14, then second cache 18 first before going to the storage 10, because the caches 14 and 18 would have the most recent modified version of a requested page. The most recent version is first found in the first cache 14, then the second cache 18 if not in the first cache 14 and then the storage 10 if not in either cache 14, 18.

Described embodiments provide techniques for allowing the use of a second level cache between a primary or first level cache and a storage to increase the cache space when the fastest access first cache 14 has the most expensive space, cost per byte, and a second cache, less expensive than the first cache but faster than the storage, can be used to increase the amount of cached data in the system. Increasing faster access cached storage space improves access to the cached data when requested data is in the cache and can be returned from cache instead of having to retrieve from the slower access, less expensive storage. Further, in described embodiments, pages are added to the second cache based on a temporal ordering in the first cache, and then sorted in the second cache based on spatial physical location in the sequential access storage so that destaged pages are written in groups of pages at proximate or consecutive physical locations in the storage to optimize the writing of the pages to the storage.

Figure 14:
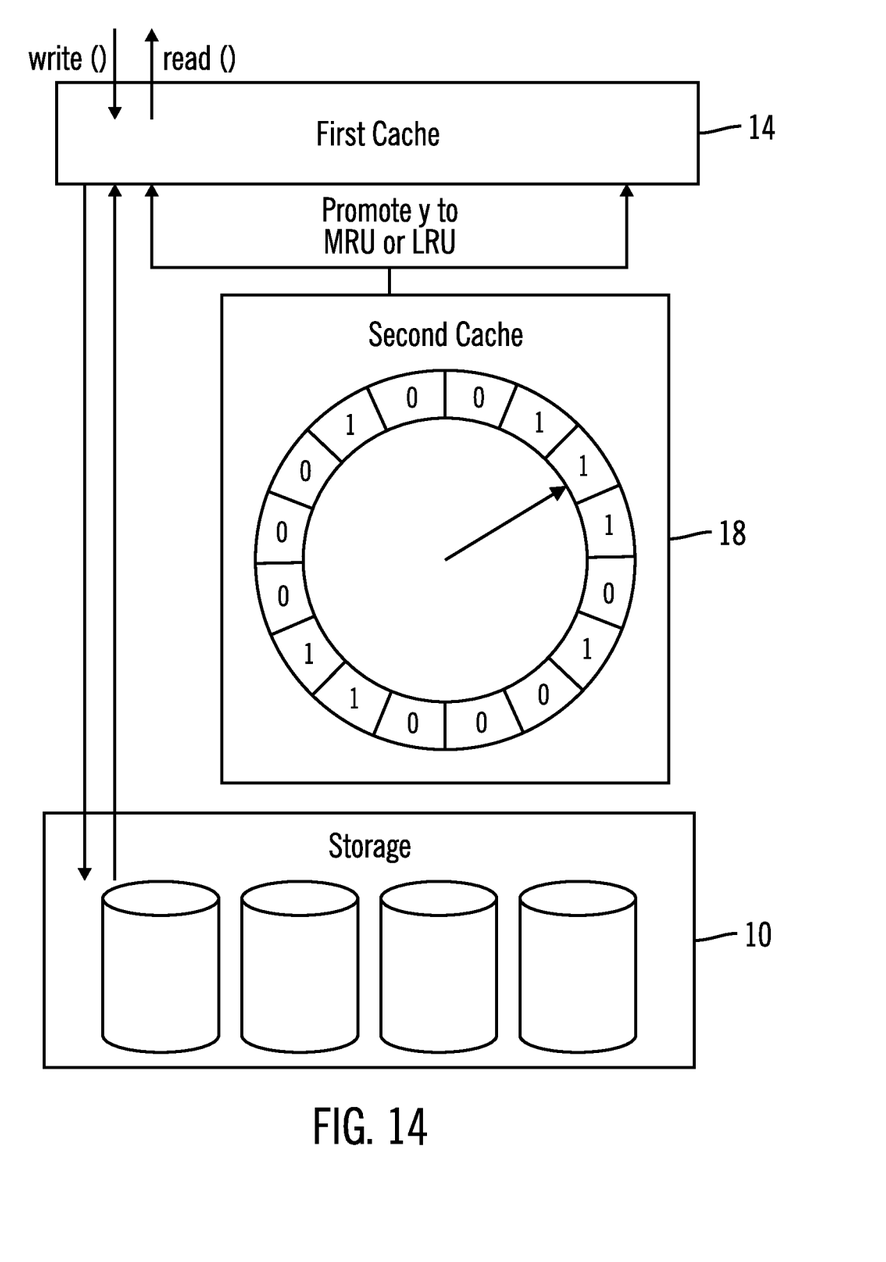
FIG. 14 illustrates an embodiment of a two level caching system and storage.

FIG. 14 illustrates an embodiment of a two level caching system 14, 18 and storage 10. The two levels of cache are the first cache 14 and the second cache 18.

The cache manager 24 optimize the first cache 14 in a two level caching system in which the first cache 14 and the second cache 18 are the two caches forming the two level caching system. The cache manager 24 predicts the utility of a page when the page is promoted from the second cache 18 into the first cache 14. Based on the utility of the page, the cache manager 24 optimizes the first cache 14 by inserting the page in the appropriate position in the appropriate LRU list 54, 56, 58.

The cache manager 24 improves utilization of the first cache 14 so that pages that are promoted in the first cache 14 from the second cache 18 are inserted in the LRU list 54, 56, 58 in the first cache 14 in a fashion as to maximize hit ratio in the first cache 14.

In certain embodiments, a page is brought into the first cache 14 upon reference. Thus, a page is promoted to the first cache 14 on every hit of that page in the second cache 18. Nevertheless, if the heat of the page is "cold" (i.e., not frequently accessed) in the second cache 18, the cache manager 24 does not want the cold page to occupy a first cache 14 page frame for a long time; therefore, the cache manager 24 inserts the cold page in the LRU list of the first cache 14, instead of the MRU, so that the cold page gets evicted soon. The cache manager 24 may insert a "hot" (i.e., frequently accessed) page at the MRU of the LRU list of the first cache 14.

The cache manager 24 identifies the heat of a page while the page resides in the first and second caches 14, 18 by maintaining reference counters 60, 78 in the first cache 14 and the second cache 18. Since any page cached in the second cache 18 has previously been in the first cache 14 and aged out of the first cache 14, the cache manager 24 utilizes the following rule to identify whether a page currently cached in the second cache 18 is still hot or has gone cold (i.e., should be promoted to the MRU end of the LRU list of the first cache 14 or to the LRU end of the LRU list of the first cache 14, respectively): a page from the second cache 18 is promoted to the MRU end of the LRU list of the first cache 14 if the page has seen more hits on the second cache 18 than the hits the page had seen while the page had previously been cached in the first cache 14. In particular:

1. For both the first cache 14 and the second cache 18, reference counters 60, 78 are maintained for each page. Let $c_R$ and $c_F$ be those counters for the first cache 14 and the second cache 18, respectively.

2. While a page is cached in the first cache 14, $c_R$ is incremented upon every reference to the page.

3. When the page is demoted from the first cache 14 to the second cache 18, if $c_F<0$, then $c_F$ is initialized to $kc_R$ (wherein k=1, 2, 3, . . . ). k is a constant that is used to adjust the heat of a page.

4. While the page is cached on the second cache, upon a reference to the page, $c_F$ is decremented, and:
  If $c_F>0$, the page is promoted to the LRU end of the LRU list of the first cache 14, so that the page is evicted soon;
  Otherwise, the page is promoted to the MRU end of the LRU list of the first cache 14.

In this way, pages that remain hot for a long time occupy frames in the first cache 14. Pages that start getting cold are pushed out to the second cache 18 and remain there for a much longer time, thereby getting a second chance to be brought into the MRU position of the LRU list of the first cache 14 if those pages become hot in the near future. In certain embodiments, $c_F$ can be initialized to the maximum of $kc_R$ and a constant K, if only pages that have seen at least K hits in the second cache 18 should be promoted to the MRU position of the LRU list of the first cache 14.

In certain embodiments, k is a static configuration parameter and is set by a system administrator. In certain alternative embodiments, k is a dynamic configuration parameter that is automatically adjusted (e.g., by the cache manager 24). In some of these alternative embodiments, k is determined as an average heat of the two caches 14, 18. Thus, k represents an appropriate scaling factor for the two caches 14, 18.

In certain embodiments, the cold pages are promoted from the second cache 18 into an accelerated LRU list 62 instead of being added to the LRU end of another LRU list of the first cache 14. When a page is to be evicted from the first cache 14, a page to be evicted is selected from the accelerated LRU list 62.

Figure 15:
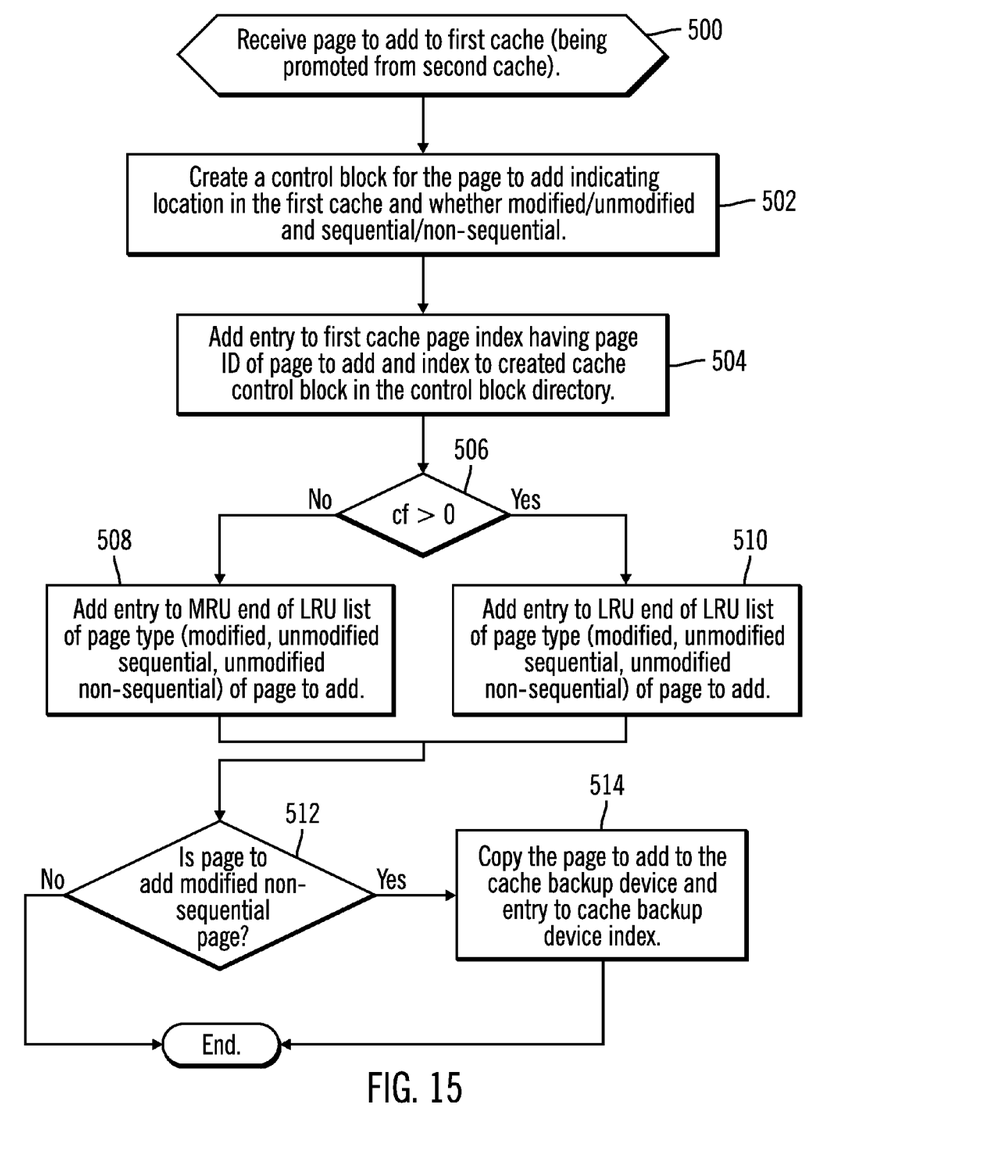
FIG. 15 illustrates an embodiment of operations to add a page to a first cache from a second cache.

FIG. 15 illustrates an embodiment of operations performed by the cache manager 24 to add, i.e., promote, a page to the first cache 14, which page may comprise a non-sequential page in the second cache 18 that is subject to a read request and as a result moved to the first cache 14 from the second cache 18. Upon receiving (at block 500) the page to add to the first cache 14, the cache manager 24 creates (at block 502) a control block 100 (FIG. 4) for the page to add indicating the 104 location in the first cache 14 and whether the page is modified/unmodified 106 and sequential/non-sequential 108. This control block 100 is added to the control block directory 52 of the first cache 14. The cache manager 24 adds (at block 504) an entry to the first cache page index 50 having the page ID of page to add and an index to the created cache control block 100 in the control block directory 52.

In block 506, the cache manager 24 determines whether $c_j > 0$ for the page. If so, processing continues to block 510, otherwise, processing continues to block 512. An entry is added (at block 508) to the MRU end of the LRU list 54, 56 or 58 of the page type of the page to add. An entry is added (at block 510) to the LRU end of the LRU list 54, 56 or 58 of the page type of the page to add. If (at block 512) the page to add is a modified non-sequential page, then the page to add is also copied (at block 514) to the first cache backup device 16 and an entry is added to the first cache backup device index 30 for the added page. If (at block 512) the page to add is unmodified sequential, control ends.

Thus, embodiments are directed to promotion in a two-level cache where a page is to be placed in the first level of cache (i.e., the first cache 14) from the second level of cache (i.e., the second cache 18). Embodiments look at the recent history of the page being promoted. If the page has been relatively hot, the cache manager 24 places the hot page at the MRU end of the LRU list of the first level of cache. If the page has been relatively cold, the cache manager 24 places the page in condition to be evicted quickly (i.e., at the LRU end of the MRU list of the first level of cache).

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7-13 and 15 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for managing data in a first cache and a second cache, comprising:
    storing, using a processor of a computer, a page in the first cache, wherein the page is associated with a first reference count in the first cache and a second reference count in a second cache;
    incrementing the first reference count for the page upon each reference to the page in the first cache;
    demoting the page from the first cache to the second cache;
    in response to determining that the second reference count is less than zero, setting the second reference count based on the first reference count;
    decrementing the second reference count for the page upon each reference to the page in the second cache;
    determining that the page is to be promoted from the second cache to the first cache;
    in response to determining that the reference count is greater than zero, adding the page to a Least Recently Used (LRU) end of an LRU list in the first cache; and
    in response to determining that the reference count is less than or equal to zero, adding the page to a Most Recently Used (MRU) end of the LRU list in the first cache.

2. The method of claim 1, wherein the first cache and the second cache are coupled to storage.

3. The method of claim 2, wherein the first cache is a faster access device than the second cache, and wherein the second cache is a faster access device than the storage.

4. The method of claim 2, wherein the first cache comprises a Random Access Memory (RAM), the second cache comprises a flash device, and the storage comprises a sequential write device.

5. The method of claim 1,
    wherein the second reference count is set equal to a constant (k) times the first reference count, and wherein the constant (k) is greater than zero.

* * * * *